United States Patent [19]

Gripe et al.

[11] Patent Number: 5,072,748

[45] Date of Patent: Dec. 17, 1991

[54] FLUID PRESSURE OPERATED INDICATING RELAY

[75] Inventors: William B. Gripe, Concord; Andrew Y. Cheng, Alameda, both of Calif.

[73] Assignee: Amot Controls, Inc., Richmond, Calif.

[21] Appl. No.: 681,562

[22] Filed: Apr. 5, 1991

[51] Int. Cl.⁵ .............................................. G05D 16/10
[52] U.S. Cl. ................................ 137/102; 137/596.18; 116/277; 116/272
[58] Field of Search ................. 137/102, 116.3, 596.18, 137/553, 559; 116/277, 272

[56] References Cited

U.S. PATENT DOCUMENTS 3,038,439  6/1962  Martin et al. ..................... 116/277 X Primary Examiner—Alan Cohan
Attorney, Agent, or Firm—Glen R. Grunewald

[57] ABSTRACT

A fluid pressure operated indicating relay including a casing defining an interior and a valve assembly movable within the interior. The valve assembly incorporates a mechanism to prevent "bounce back" of the valve assembly after the relay has been tripped as a result of a drop of fluid pressure at the relay inlet port.

8 Claims, 3 Drawing Sheets

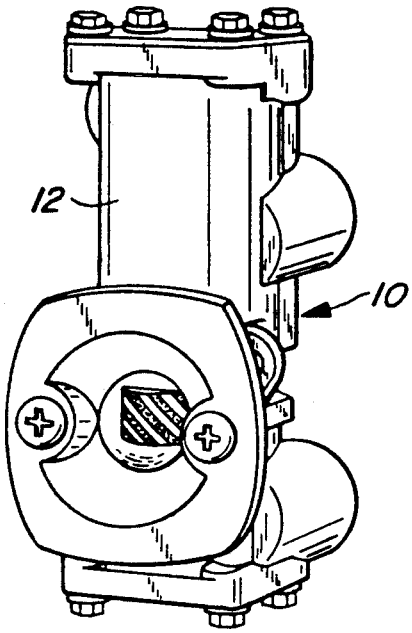
FIG._1
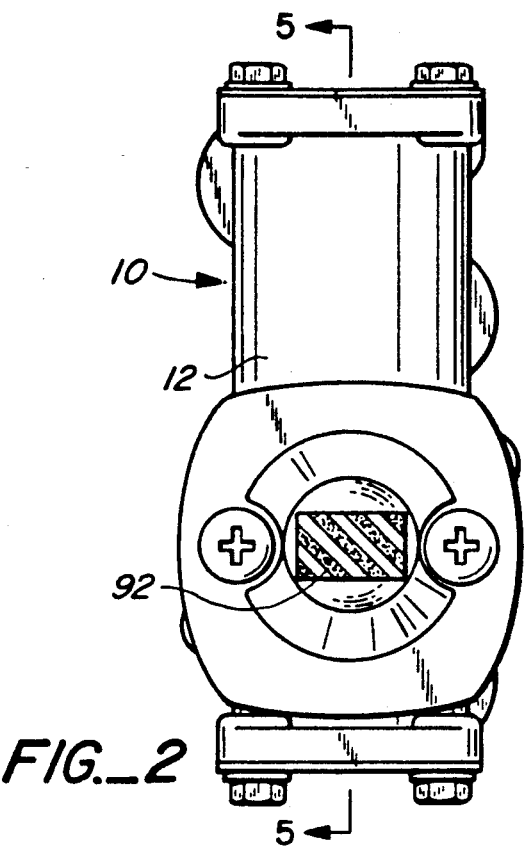
FIG._2
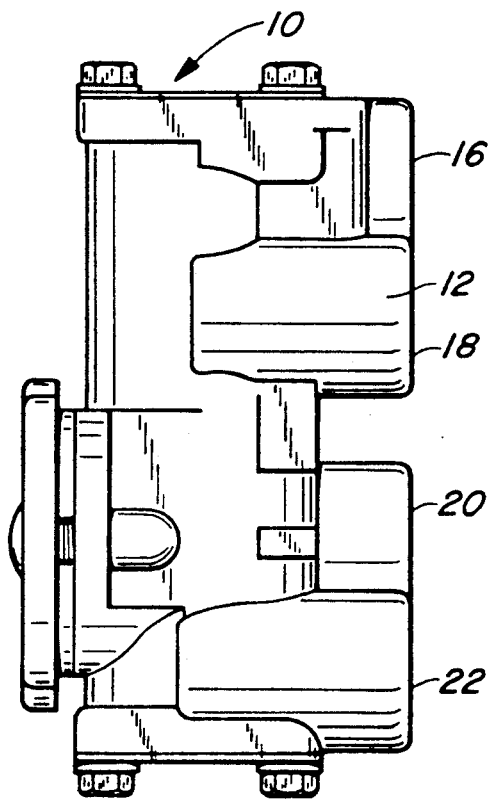
FIG._3
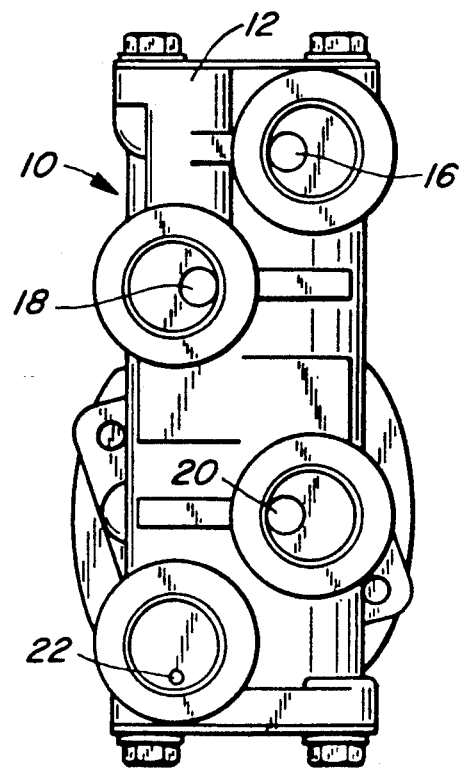
FIG._4

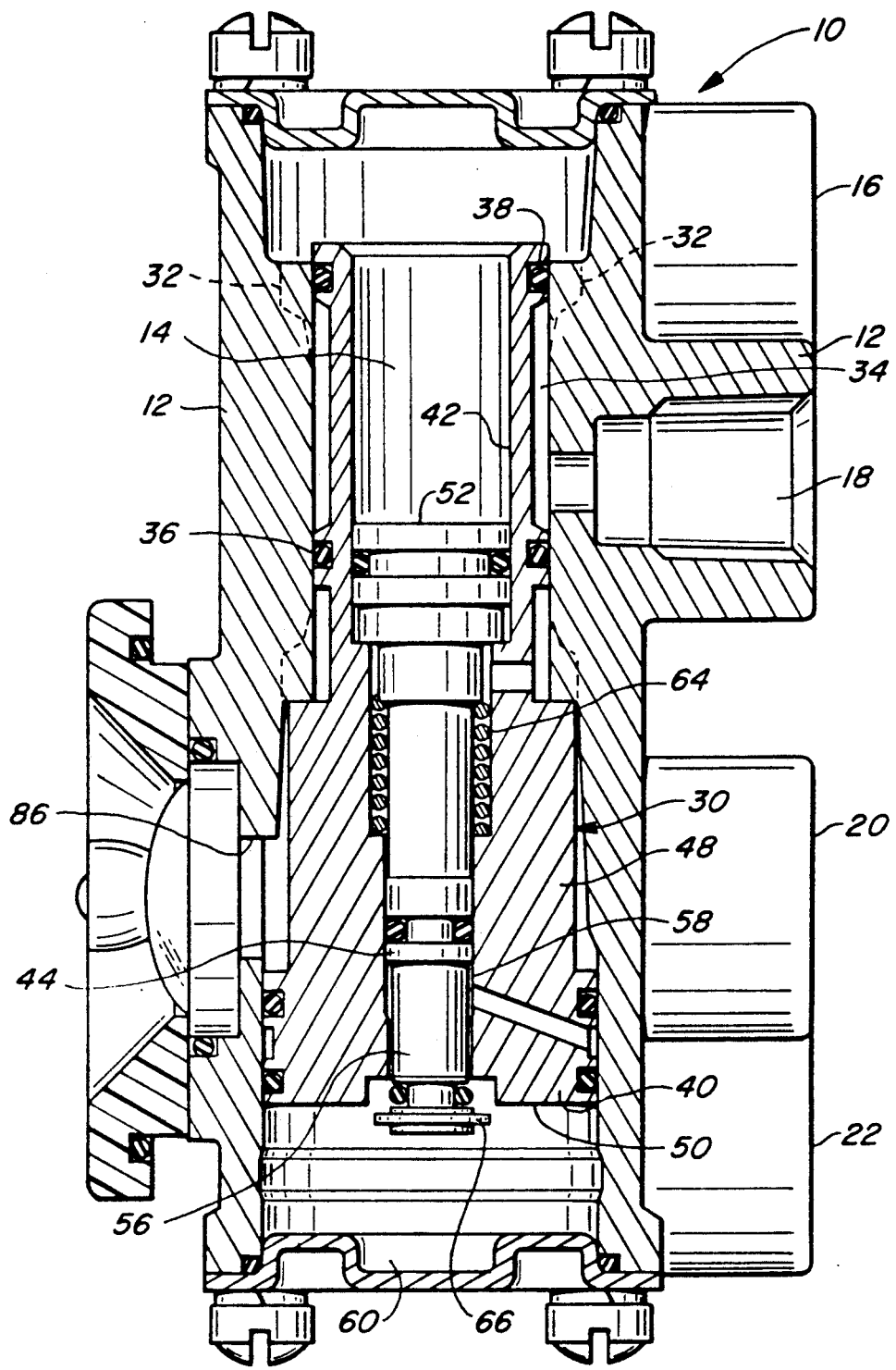
FIG._5

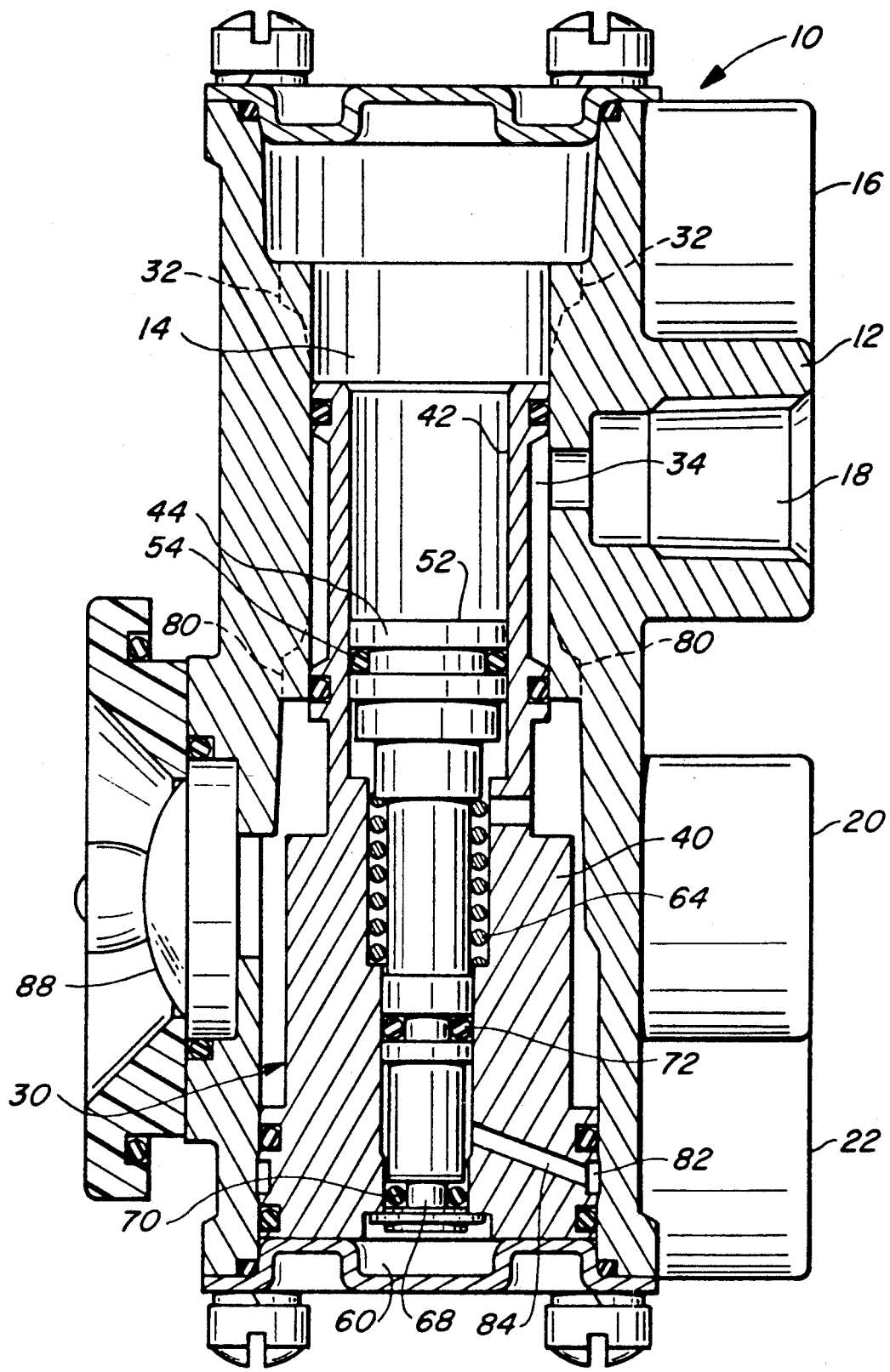
FIG._6

FLUID PRESSURE OPERATED INDICATING RELAY

TECHNICAL FIELD

The present invention relates to an indicator relay to be employed in a control system. More particularly, the indicator relay is fluid pressure operated and incorporates structure which will isolate the trip port of the relay when fluid pressure at the input port of the relay falls below a predetermined level of magnitude.

BACKGROUND ART

U.S. Pat. No. 3,038,439, issued June 12, 1962 to Martin et al, discloses a relay control system which is particularly applicable for protecting and controlling the operation of internal combustion engines such as heavy diesel engines. The control system disclosed in the patent incorporates a plurality of indicating relays which are operated pneumatically. Each indicating relay is operatively associated with a sensing device such as normally closed two- or three-way valves which detect undesirable conditions such as temperatures, pressures, vibration, liquid levels, and so forth.

A sensing device is connected to a relay trip port and pressurized fluid is introduced into an input port of the relay. As long as the sensed condition is normal the relay directs the pressurized fluid entering the input port through an output port, the output port, in most cases, being in communication with the input port of a relay of like construction in the control system.

When, however, a condition is sensed by the sensing device which falls outside desired perimeters, the relay will operate to cut off the input port from the output port and place the output port in communication with a vent port. This will result in venting of the residual pressure in the output port and tripping of all the down stream relays.

In the arrangement of U.S. Pat. No. 3,038,439, the operation is carried out by means of a valve assembly in the interior of the relay casing, said valve assembly being generally in the form of a piston movable within the interior of the casing.

With the arrangement of U.S. Pat. No. 3,039,439, a problem can present itself in that the valve assembly or piston mounted within the casing can "bounce back" from its tripped position if for some reason the pressure at the input port of the indicator relay falls below a predetermined minimum. This undesirable action results from residual pressure in the line extending from the trip port. In essence, the trip signal line pressure can result in the resetting of the indicating relay to its normal operative position when such is not desired, thus creating a condition which can cause damage to the engine or other device being sensed.

DISCLOSURE OF INVENTION

The fluid pressure operated indicating relay constructed in accordance with the teachings of the present invention has all of the advantages of the relay which is the subject of U.S. Pat. No. 3,038,439. In addition, the present relay incorporates structure which will prevent "bounce back" of the relay valve assembly due to residual pressure in the trip signal line after pressure at the relay input port falls below a predetermined level of magnitude. With the present arrangement the relay cannot be reset until pressure to the input port is restored to the desired level.

The fluid pressure operated indicating relay of the present invention includes a casing defining an interior, an input port to direct pressurized fluid into the casing interior, an output port for directing pressurized fluid from the casing interior to a first predetermined location, a trip port leading from the casing interior, and a vent port for venting pressurized fluid from the casing interior.

A valve assembly is mounted for movement in the casing interior between a first position wherein communication is established between the input port and the output port to direct pressurized fluid entering the casing interior from the input port outwardly through the output port and a second position wherein the input port and the output port are not in communication and in which communication is established between the output port and the vent port to vent pressurized fluid from the output port through the interior and the vent port. The valve assembly moves from the first position to the second position in response to a decrease of fluid pressure at the trip port.

The valve assembly includes valve assembly return preventing means responsive to a decrease of fluid pressure at the input port below a predetermined level of magnitude for preventing the valve assembly from returning from the second position to the first position as a result of fluid pressure at the trip port until fluid pressure at the input port reattains the desired level of magnitude.

The valve assembly comprises a first piston element defining a throughbore and a second piston element movably mounted in the throughbore, the first and second piston elements at least partially comprising the valve assembly return preventing means.

The second piston element is movable between an activated position wherein return of the valve assembly to the first position is prevented and a deactivated position wherein return of the valve assembly is not prevented. Pressurized fluid in the casing interior moves the second piston element to the deactivated position when fluid pressure at the input port is at least at the predetermined level of magnitude. The valve assembly return preventing means additionally comprises biasing means for moving the second piston to the activated position when fluid pressure at the input port falls below the predetermined level of magnitude.

Other features, advantages, and objects of the present invention will become apparent with reference to the following description and accompanying drawings.

BRIEF DESCRIPTION OF DRAWINGS

FIG. 1 is a perspective view of a preferred form of apparatus constructed in accordance with the teachings of the present invention;

FIG. 2 is a somewhat enlarged, frontal view of the apparatus;

FIG. 3 is a side view of the apparatus;

FIG. 4 is a rear view of the apparatus;

FIG. 5 is a further enlarged, cross-sectional view of the apparatus taken along the line 5—5 in FIG. 2 and illustrating the relative positions assumed by the structural components of the apparatus in one condition; and FIG. 6 is a view similar to FIG. 5 but illustrating the relative positions assumed by the apparatus structural components in another condition.

BEST MODE FOR CARRYING OUT THE INVENTION

Referring now to the drawings, a fluid pressure operated indicating relay constructed in accordance with the teachings of the present invention is designated by reference numeral 10. The relay includes a casing 12 defining an interior 14.

The casing additionally defines an input port 16. Input port 16 is connected by any suitable conduit means (not shown) to a source of pressurized fluid such as an air compressor (not shown).

Also defined by casing 12 is an output port 18 leading to interior 14. In a control system of the type disclosed in U.S Pat. No. 3,038,439 the output port 18 is normally directed to the input port of another fluid pressure operated indicating relay (not shown) incorporated in the system.

Two additional ports, a vent port 20 and a trip port 22, are defined by casing 12. Vent port 20 normally communicates directly with the ambient atmosphere while trip port 22 is in communication with a sensing device (not shown) incorporated in the control system which may be for example a normally closed two- or three-way valve. As is the case with the indicating relay shown in U.S. Pat. No. 3,038,439, the sensing device operatively associated with the trip port of relay 10 senses or detects undesirable conditions such as undesirable temperatures, pressures, vibration, liquid levels, etc.

A valve assembly 30 is mounted for movement in casing interior 14 between a first position as shown in FIG. 5 and a second position as illustrated in FIG. 6. The first position is that assumed by the valve assembly 30 when the control system is functioning normally and the sensing device operatively associated with the relay is sensing a condition within the desired range. In the first position a fluid-flow path exists between the pressurized input port 16 and the output port 18. The casing is cut out where designated by reference numeral 32 so that the air or other pressurized fluid is directed from the port 16 and into an annular space 34 defined by valve assembly 30 and the casing. O-rings 36, 38 ensure that the pressurized fluid from port 16 is confined to annular space 34.

It can be seen that the valve assembly 30 includes a first piston element 40 defining a throughbore 42 and a second piston element 44 slidably disposed in the throughbore.

First piston element 40 includes an enlarged piston head 48 having an outer end 50. The second piston element 44 has a piston head 52 having a groove within which is disposed an O-ring seal 54. Second piston element 44 includes a cylindrically shaped portion 56 which has a smaller circumference than the section of the throughbore 42 within which portion 56 resides so that an opening 58 is defined therebetween leading to the piston head outer end 50.

Piston head outer end 50 and the casing 12 define a fluid chamber 60 which, of course, has the same pressure as trip port 22 and such pressure urges the first piston element upwardly and to the position illustrated in FIG. 5 when the sensing device operatively associated with the vent port senses a normal condition. At the same time, the pressure entering the casing interior through input port 16 pushes against piston head 52 and urges it downwardly and against a seat defined by first piston element 40, as shown in FIG. 5. A coil compression spring 64 disposed about the second piston element and within the first piston element urges the second piston element upwardly as shown in FIG. 5. Under normal conditions, however, the pressure from input port 16 is sufficient to overcome the force exerted by the coil compression spring 64.

Adjacent outer end 50 of piston head 48, second piston element 44 has a radial flange element 66. The flange element 66 is next to a reduced section 68 of the second piston element about which is disposed an O-ring 70. Another O-ring 72 is spaced from O-ring 70 on the opposite end of cylindrically-shaped portion 56. When the second piston element 44 is in the deactivated position illustrated in FIG. 5, the O-ring 70 is spaced away from the piston head 48. Thus, communication is established between fluid chamber 60 and opening 58.

Assume now that the input pressure at port 16 is at its normal pressure, i.e., the pressure of the fluid is at or above a predetermined minimum level. If a pressure drop occurs in trip port 22, as for example when the sensing device operatively associated therewith senses an undesirable condition, the pressurized air entering the casing interior from the input port 16 will move the entire valve assembly downwardly to the position shown in FIG. 6. This action now places the output port 18 into direct communication with vent port 20 through annular space 34. It will be appreciated that the casing is cut out where designated by reference numeral 80 to establish such fluid-flow communication. Venting of the pressurized fluid from output port 18 through vent port 20 will shut down any down-stream relays of similar construction in the manner taught in the aforesaid U.S. Pat. No. 3,038,439.

FIG. 6 illustrates the activated position assumed by second piston element 44 with respect to the first piston element 40 when the pressure of fluid at inlet port 16 subsequently falls below a predetermined minimum level. If this occurs after the relay has been tripped, any residual pressure remaining in the trip signal line communicating with trip port 22 could result in movement of the entire valve assembly back to the position shown in FIG. 5, which is, of course, highly undesirable.

In the present arrangement this action is prevented by ensuring that such residual pressure does not enter chamber 60. Reduction of air pressure in the interior of the casing in the vicinity of inlet port 16 will allow the coil compression spring 64 to move the second piston element to the position shown in FIG. 6. In such position O-ring 70 forms a fluid-tight seal with the piston head 48 of first piston element 40. With the piston head 48 in the position shown in FIG. 6, a circumferential groove 82 formed about the piston head 48 is in communication with the trip port 22. An opening 84 is formed in piston head 48 to direct the pressurized fluid from trip port 22 to opening 58 which is now sealed off from chamber 60 by O-ring 70. Thus, any residual pressure at trip port 22 will not be directed against the piston head outer end 50 but instead will be neutralized and not tend to move the valve assembly 30 to its FIG. 5 position. The strength of spring 64 must of course be sufficient to ensure this.

Casing 12 additionally defines an observation aperture 86 operatively associated with a viewing window or lens 88. Indicia 92 (FIGS. 1 and 2) is formed on or applied to first piston element head 48 for placement into selective registry with the observation aperture during movement of the valve assembly. FIGS. 1 and 2 show indicia in the form of stripes which may suitably be utilized to indicate that the relay is in a tripped condition, it being appreciated that another form of indicia is immediately adjacent to the stripes to register with the observation aperture when the relay is in its normal or untripped condition.

What is claimed:

1. A fluid pressure operated indicating relay, said indicating relay comprising, in combination:

a casing defining an interior, an input port to direct pressurized fluid into said casing interior, an output port for directing pressurized fluid from said casing interior to a first predetermined location, a trip port leading from said casing interior, and a vent port for venting pressurized fluid from said casing interior;

a valve assembly mounted for movement in said casing interior between a first position wherein communication is established between said input port and said output port to direct pressurized fluid entering said casing interior from said input port outwardly through said output port and a second position wherein said input port and said output port are not in communication and wherein communication is established between said output port and said vent port to vent pressurized fluid from said output port through said interior and said vent port, said valve assembly moving from said first position to said second position responsive to a decrease of fluid pressure at said trip port, and said valve assembly including valve assembly return preventing means responsive to a decrease of fluid pressure at said input port below a predetermined level of magnitude for preventing said valve assembly from returning from said second position to said first position resulting from fluid pressure at said trip port until fluid pressure at said input port reattains said predetermined level of magnitude.

2. The fluid pressure operated indicating relay of claim 1 wherein said valve assembly comprises a first piston element defining a throughbore and a second piston element movably mounted in said throughbore, said first and second piston elements at least partially comprising said valve assembly return preventing means.

3. The fluid pressure operated indicating relay of claim 2 wherein said second piston element is movable between an activated position wherein return of the valve assembly to said first position is prevented and a deactivated position wherein return of the valve assembly is not prevented, pressurized fluid in said casing interior moving said second piston element to said deactivated position when fluid pressure at said input port is at least at said predetermined level of magnitude, said valve assembly return preventing means additionally comprising biasing means for moving said second piston to said activated position when fluid pressure at said input port falls below said predetermined level of magnitude.

4. The fluid pressure operated indicating relay of claim 3 wherein said first piston element includes an enlarged piston head having an outer end at least partially defining a fluid chamber in said casing interior with said casing, said first piston element and said second piston element defining a fluid-flow passageway providing communication between said trip port and said fluid chamber when said piston element is in said deactivated position whereby fluid pressure in said fluid chamber exerts a bias against said piston head outer end.

5. The fluid pressure operated indicating relay of claim 4 wherein said second piston element interrupts communication between said trip port and said fluid chamber through said fluid-flow passageway when said second piston element is in said activated position.

6. The fluid pressure operated indicating relay of claim 5 wherein said fluid-flow passageway includes a groove formed about the outer periphery of said enlarged piston head communicating with said trip port when said valve assembly is in said second position and an opening formed in said enlarged piston head and leading from said groove to said throughbore.

7. The fluid pressure operated indicating relay of claim 6 wherein said valve assembly additionally includes seal mean connected to said second piston element and engageable with said first piston element when said piston element is in said activated position to interrupt communication between said trip port and fluid chamber.

8. The fluid pressure operated indicating relay of claim 2 wherein said casing additionally defines an observation aperture, said first piston element having indicia thereon for placement into selective registry with said observation aperture during movement of said valve assembly.

* * * * *